United States Patent
Ming et al.

(10) Patent No.: US 12,482,623 B2
(45) Date of Patent: Nov. 25, 2025

(54) FUSING DEVICE AND POWER BATTERY

(71) Applicant: EVE POWER CO., LTD., Hubei (CN)

(72) Inventors: Wenhao Ming, Hubei (CN); Pengxiang Zhu, Hubei (CN); Fei Sun, Hubei (CN); Dingding Yuan, Hubei (CN)

(73) Assignee: EVE POWER CO., LTD., Jingmen (CN)

( * ) Notice: Subject to any disclaimer, the term of this patent is extended or adjusted under 35 U.S.C. 154(b) by 120 days.

(21) Appl. No.: 18/493,867

(22) Filed: Oct. 25, 2023

(65) Prior Publication Data

US 2024/0055211 A1 Feb. 15, 2024

Related U.S. Application Data

(63) Continuation of application No. PCT/CN2022/144004, filed on Dec. 30, 2022.

(30) Foreign Application Priority Data

Nov. 10, 2022 (CN) .......................... 202222991155.9

(51) Int. Cl.
*H01H 85/175* (2006.01)
*H01H 85/044* (2006.01)
*H01M 50/583* (2021.01)

(52) U.S. Cl.
CPC ........ *H01H 85/044* (2013.01); *H01H 85/175* (2013.01); *H01M 50/583* (2021.01); *H01M 2200/103* (2013.01)

(58) Field of Classification Search
CPC ............. H01H 85/0411; H01H 85/044; H01H 85/046; H01H 85/165–1755
See application file for complete search history.

(56) References Cited

U.S. PATENT DOCUMENTS 3,280,281 A * 10/1966 Berger ................ H01H 85/044
  337/181
4,839,625 A * 6/1989 Newbery ............... H01H 85/47
  337/166

(Continued)

FOREIGN PATENT DOCUMENTS

CN        208608292 U        3/2019
CN        112490595 A        3/2021

(Continued)

OTHER PUBLICATIONS

Wu CN208608292U Translation.*

(Continued)

*Primary Examiner* — Jacob R Crum
(74) *Attorney, Agent, or Firm* — PV IP PC; Wei Te Chung; Christopher S. Ruprecht

(57) ABSTRACT

The present application discloses a fusing device and a power battery. The fusing device includes: a conductive sheet and an insulating connection component, wherein a clearance portion is arranged on the conductive sheet, and the conductive sheet defines a fusing portion at the clearance remaining position on at least one side of the clearance portion; and the insulating connection component is provided with a connection portion and a load bearing portion, the insulating connection component is connected to the conductive sheet through the connection portion, the load bearing portion is located below the fusing portion, and molten beads formed after the fusing portion is blown are enabled to fall into the load bearing portion.

16 Claims, 4 Drawing Sheets

(56) References Cited

U.S. PATENT DOCUMENTS

| | | | | |
|---|---|---|---|---|
| 11,721,509 | B1* | 8/2023 | Chiu | H01H 85/10 |
| | | | | 337/159 |
| 2002/0014945 | A1* | 2/2002 | Furuuchi | H01L 23/5256 |
| | | | | 257/E23.149 |
| 2018/0123161 | A1* | 5/2018 | Xing | H01M 10/0459 |
| 2021/0242549 | A1* | 8/2021 | Zheng | H01M 50/209 |

FOREIGN PATENT DOCUMENTS

| | | |
|---|---|---|
| CN | 217788721 U | 11/2022 |
| CN | 217788748 U | 11/2022 |
| CN | 218039743 U | 12/2022 |
| JP | H09115419 A | 5/1997 |

OTHER PUBLICATIONS

International Search Report in International application No. PCT/CN2022/144004, mailed on Jun. 23, 2023.
Written Opinion of the International Search Authority in International application No. PCT/CN2022/144004, mailed on Jun. 23, 2023.

\* cited by examiner

FUSING DEVICE AND POWER BATTERY

CROSS-REFERENCE TO RELATED APPLICATION

The present application claims the priority to International Application No. PCT/CN2022/144044, field on Dec. 30, 2022, which claims the priority to Chinese Patent Application No. 202229291155.9, filed on Nov. 10, 2022, the contents of which are incorporated herein by reference in their entirety.

TECHNICAL FIELD

The present application relates to the technical field of battery technology, and in particular to a fusing device and a power battery.

BACKGROUND

Lithium batteries have advantages such as small volume, high energy density, long service life, and environmental friendliness, and are widely applied to industries such as automobiles, electronic products, and energy storage systems. Safety of a lithium battery is closely related to internal structural design, a tab of an anode of a relevant structure is generally connected to a terminal of a cover plate through a connection sheet, and a fuse is arranged on the connection sheet. When a cell is externally short-circuited, specific large current and temperature rise cause the connection sheet to reach a material melting point, and the fuse is blown. However, the relevant structure is unprotected by the fuse, the fuse is blown, the connection sheet is broken, and molten beads may scald a separator film of the cell to cause a safety risk.

SUMMARY

The present application provides a fusing device and a power battery, to prevent a first conductive sub-sheet and a second conductive sub-sheet from overlapping other elements after being broken, without causing secondary short-circuit; and prevent molten beads from scalding a separator film or an insulating tape of a cell pack, therefore, the safety protection performance is very high.

According to an aspect, the present application provides a fusing device, including:
- a conductive sheet, wherein a clearance portion is arranged on the conductive sheet, and the conductive sheet defines a fusing portion at the clearance remaining position on at least one side of the clearance portion; and
- an insulating connection component, wherein the insulating connection component is provided with a connection portion and a load bearing portion, the insulating connection component is connected to the conductive sheet through the connection portion, the load bearing portion is located below the fusing portion, and molten beads formed after the fusing portion is blown is enabled to fall into the load bearing portion.

According to another aspect, the present application provides a power battery, including a housing, a cover plate, a cell pack, and the foregoing fusing device, wherein the housing is provided with a mounting cavity, the cell pack is mounted in the mounting cavity, the cover plate is configured to block an opening of the mounting cavity, the cell pack is provided with a tab, the cover plate is provided with a terminal, and the tab and the terminal are connected through a conductive sheet of the fusing device.

The present application provides a fusing device and a power battery. After a conductive sheet is mounted, an insulating connection component is mounted onto a clearance portion of the conductive sheet through a connection portion. When current of the conductive sheet is overloaded, a fusing portion is the weakest part of the conductive sheet, a large current causes the fusing portion to melt to generate molten beads, and a battery loop is broken. In this case, the molten beads of the fusing portion fall onto a load bearing portion of the insulating connection component, to prevent the molten beads from scalding a separator film or an insulating tape of a cell pack, therefore, the safety protection performance is very high.

Figure 1:
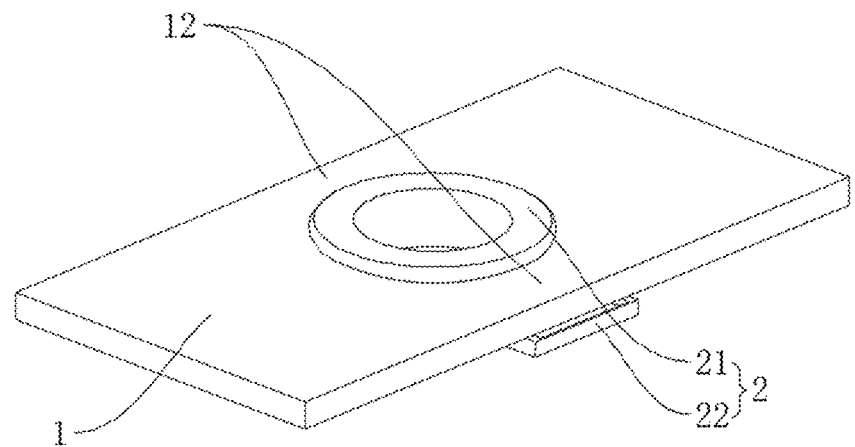
FIG. 1 is a schematic diagram of a structure of a fusing device according to a specific implementation of the present application.

Reference numerals in the drawings are as follows:
- 1, conductive sheet; 11, clearance portion; 12, fusing portion;
- 2, insulating connection component; 21, connection portion; 211, first flange portion; 212, through-hole; 213, isolation portion; 214, second flange portion; 22, load bearing portion; 221, groove.

DETAILED DESCRIPTION

In descriptions of the present application, unless expressly stated and defined otherwise, the terms "connected", "connection", "fixed", etc. are to be construed broadly, for example, as fixed connection, detachable connection or integral connection; as mechanical connection or electrical connection, and as direct connection or indirect connection via an intermediary or communication inside two elements or interaction between two elements. Those skilled in the art can understand specific meanings of the terms in the present application according to specific situations.

In the present application, unless otherwise clearly stipulated and limited, that a first feature is "above" or "below" a second feature may include that the first feature directly contacts the second feature, or may include that the first feature does not contact the second feature directly but contacts the second feature by means of another feature between them. Moreover, that the first feature is "over", "above", and "up" the second feature includes that the first feature is directly above and obliquely above the second feature, or simply indicates that a horizontal height of the first feature is higher than that of the second feature. That the first feature is "under", "below", and "down" the second feature includes that the first feature is directly under and obliquely under the second feature, or simply indicates that a horizontal height of the first feature is less than that of the second feature.

In the descriptions of the present embodiment, orientation or position relationships indicated by the terms such as "up", "down", "left", and "right" are based on orientation or position relationships shown in the accompanying drawings, and are used only for ease of descriptions and simplification of operation, rather than indicating or implying that the mentioned device or elements needs to have a particular orientation or needs to be constructed and operated in a particular orientation. Therefore, such terms should not be construed as limiting of the present application. In addition, the terms "first" and "second" are only distinguished in descriptions, but do not have special meanings.

Figure 2:
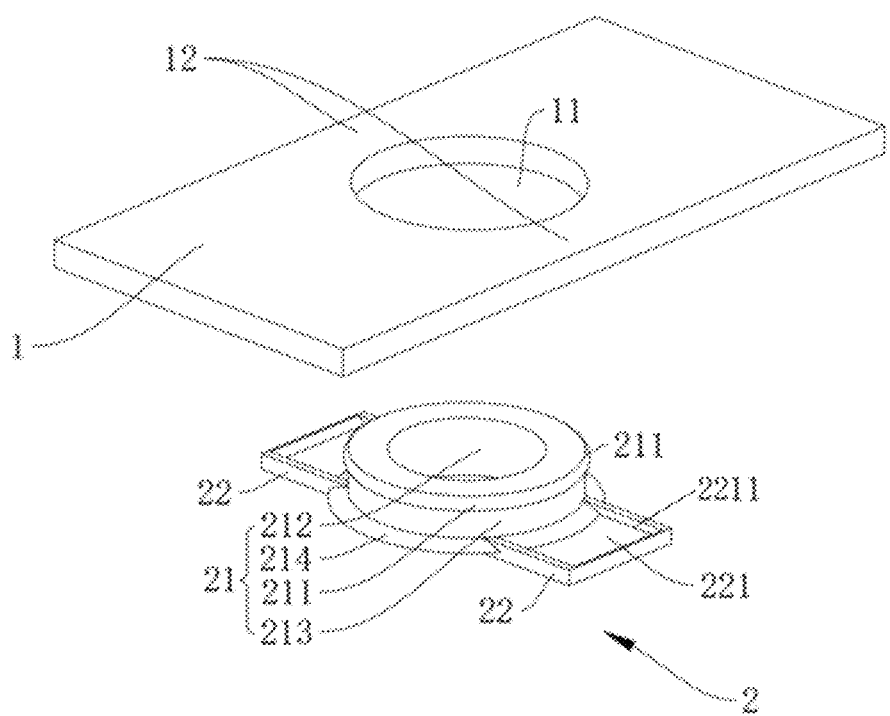
FIG. 2 is an explosion diagram of a first structure of a fusing device according to a specific implementation of the present application.
Figure 3:
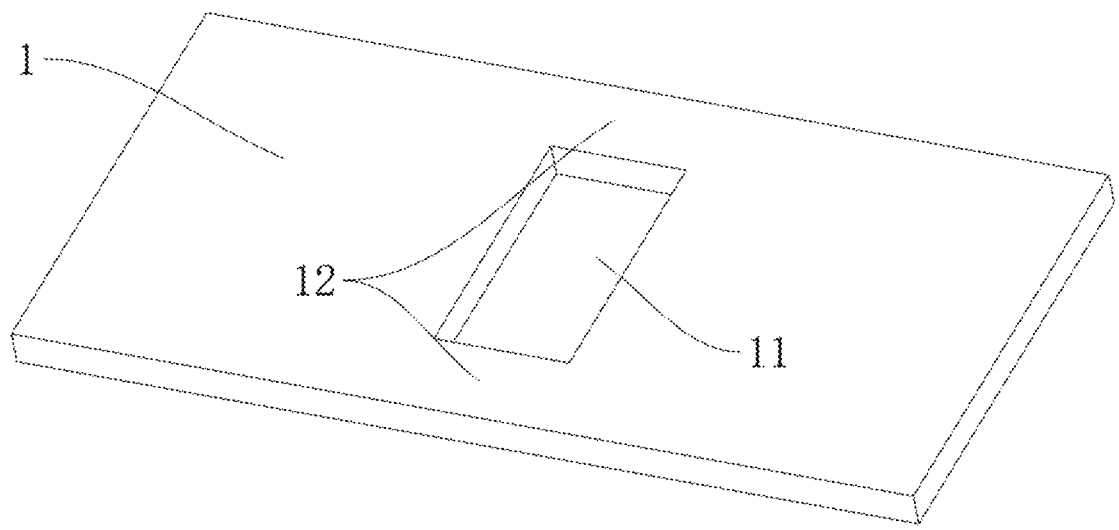
FIG. 3 is a schematic diagram of a first structure of a conductive sheet according to a specific implementation of the present application.
Figure 4:
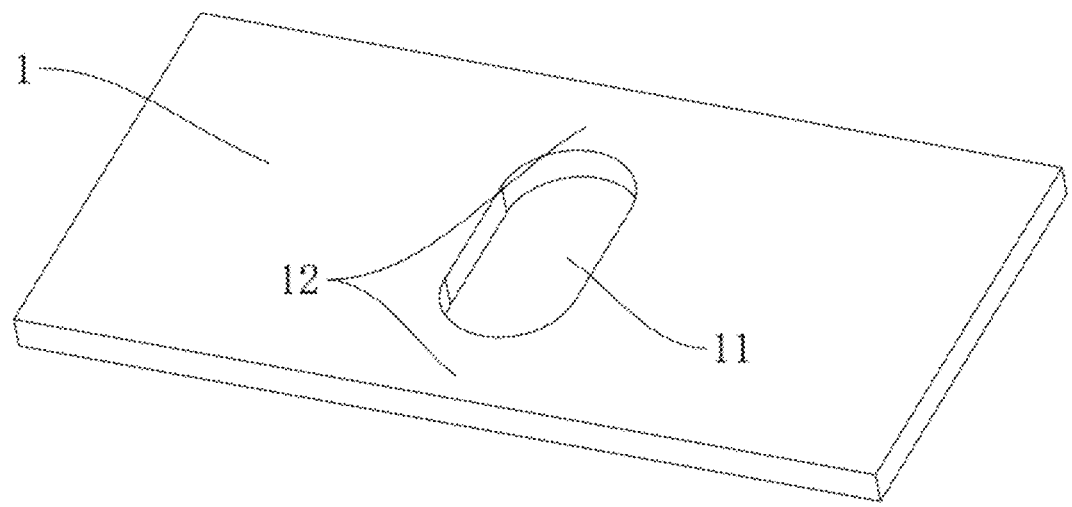
FIG. 4 is a schematic diagram of a second structure of a conductive sheet according to a specific implementation of the present application.

As shown in FIG. 1 and FIG. 2, the present embodiment provides a fusing device. The fusing device includes a conductive sheet 1 and an insulating connection component 2, wherein a clearance portion 11 is arranged on the conductive sheet 1, the conductive sheet 1 defines a fusing portion 12 at the clearance remaining position on at least one side of the clearance portion 11; and the insulating connection component 2 is provided with a connection portion 21 and a load bearing portion 22, the insulating connection component 2 is connected to the conductive sheet 1 through the connection portion 21, the load bearing portion 22 is located below the fusing portion 12, and molten beads formed after the fusing portion 12 is blown is enabled to fall into the load bearing portion 22. It should be noted that, the clearance remaining position is arranged on one side or two sides of the clearance portion 11 in a width direction of the conductive sheet 1, due to the small current flow area of the conductive sheet 1 at the part, when the current of the conductive sheet 1 is overloaded, the clearance remaining position is a weak part and is preferentially blown, so as to form the fusing portion 12.

After the conductive sheet 1 is mounted, the insulating connection component 2 is mounted onto the clearance portion 11 of the conductive sheet 1 through the connection portion 21. When current of the conductive sheet 1 is overloaded, the fusing portion 12 is a weakest part of the conductive sheet 1, the large current causes the fusing portion 12 to melt to generate molten beads, and a battery loop is broken. In this case, the molten beads of the fusing portion 12 fall onto the load bearing portion 22 of the insulating connection component 2, to prevent the molten beads from scalding a separator film or an insulating tape of a cell pack, therefore, the safety protection performance is very high.

In an embodiment, one side of the load bearing portion 22 facing the fusing portion 12 is provided with a groove 221. The molten beads of the fusing portion 12 fall into the groove 221, and the groove 221 can hold the molten beads, to prevent the molten beads from separating from the load bearing portion 22, thereby improving safety performance of a power battery.

In an embodiment, a groove bottom of the groove 221 is circumferentially provided with a fillet 2211. In an aspect, the fillet of the groove 221 facilitates flowing performance of the molten beads, to cause the molten beads to flow to the groove bottom of the groove 221; and in another aspect, after the insulating connection component 2 is dismounted, the fillet helps the molten beads detach from the groove 221 when removing the molten beads.

In a related technology, the broken connection sheet may overlap other elements, to cause secondary short-circuit. In order to resolve the foregoing problem, in the present embodiment, the connection portion 21 is inserted into the clearance portion 11, a first conductive sub-sheet and a second conductive sub-sheet are formed after the fusing portion 12 is blown, and the connection portion 21 is enabled to separate the first conductive sub-sheet and the second conductive sub-sheet. After the conductive sheet 1 is blown, the first conductive sub-sheet and the second conductive sub-sheet are separated by the insulating connection component 2, to prevent the first conductive sub-sheet and the second conductive sub-sheet from overlapping other elements after being broken, without causing secondary short-circuit. In addition, the first conductive sub-sheet and the second conductive sub-sheet are completely separated, and are impossible to overlap each other again.

In the present embodiment, the connection portion 21 includes a first flange portion 211, an isolation portion 213, and a second flange portion 214, a cross-sectional size of each of the first flange portion 211 and the second flange portion 214 is greater than a cross-sectional size of the isolation portion 213, the isolation portion 213 is threaded through the clearance portion 11, and the first flange portion 211 and the second flange portion 214 clamp two end faces of the clearance portion 11, so that the insulating connection component 2 is stuck into the clearance portion 11.

In an embodiment, a side wall of the first flange portion 211 is arc-shaped. The arc-shaped first flange portion 211 can play a role in guiding when being threaded through the clearance portion 11, to reduce abrasion of the first flange portion 211, making it convenient for the first flange portion 211 to be threaded through the clearance portion 11.

In an embodiment, a through-hole 212 is arranged in the middle of the connection portion 21. The arrangement of the through-hole 212 enables the connection portion 21 to be deformed to some extent, to help the first flange portion 211 be threaded through the clearance portion 11.

Certainly, in another embodiment, the connection portion 21 may alternatively be connected through a screw or bonded to the clearance portion 11.

In the present embodiment, a material of the insulating connection component 2 is rubber. In an aspect, the insulating connection component 2 has insulation performance; and in another aspect, the connection portion 21 of the insulating connection component 2 can be deformed to some extent, making it convenient to assemble the insulating connection component 2.

In the present embodiment, as shown in FIG. 2 to FIG. 5, the clearance portion 11 is circular, and a shape of the connection portion 21 matches that of the clearance portion 11. In another embodiment, the clearance portion 11 may alternatively be kidney-shaped or square. The clearance portion 11 is a clearance hole, or the clearance portion 11 is a clearance groove arranged on a side wall of the conductive sheet 1.

Figure 5:
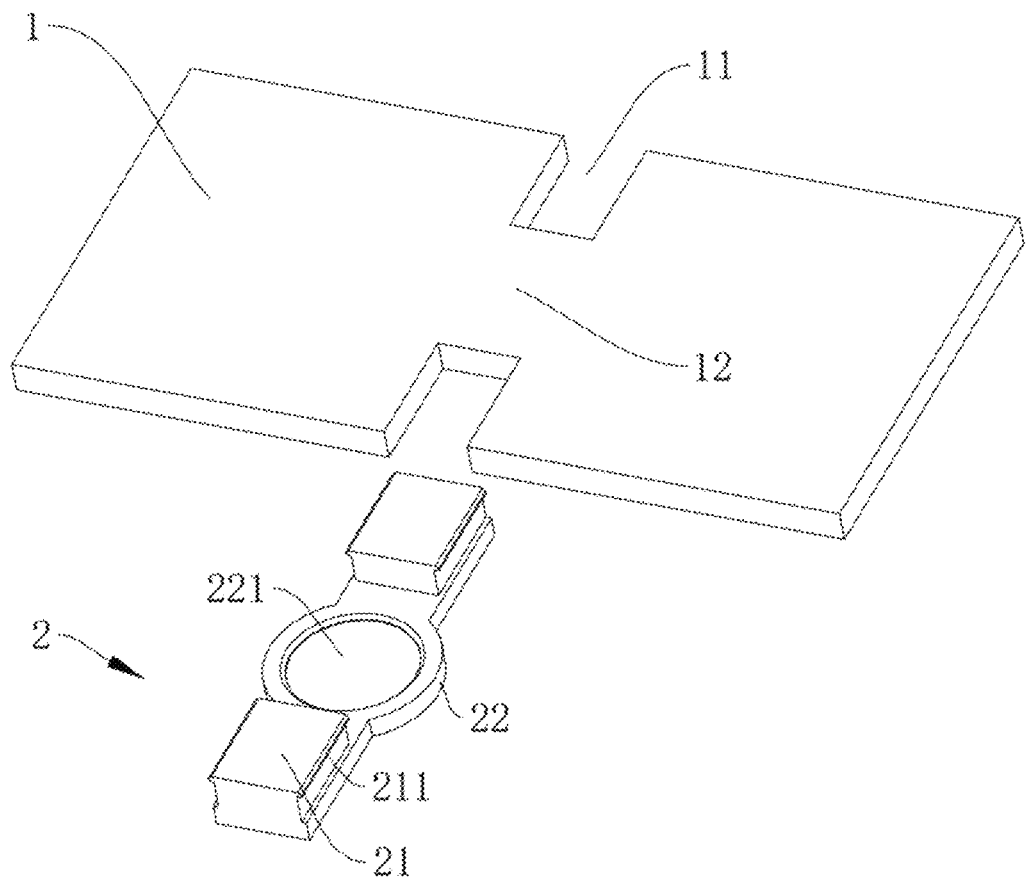
FIG. 5 is an explosion diagram of a second structure of a fusing device according to a specific implementation of the present application.
Figure 6:
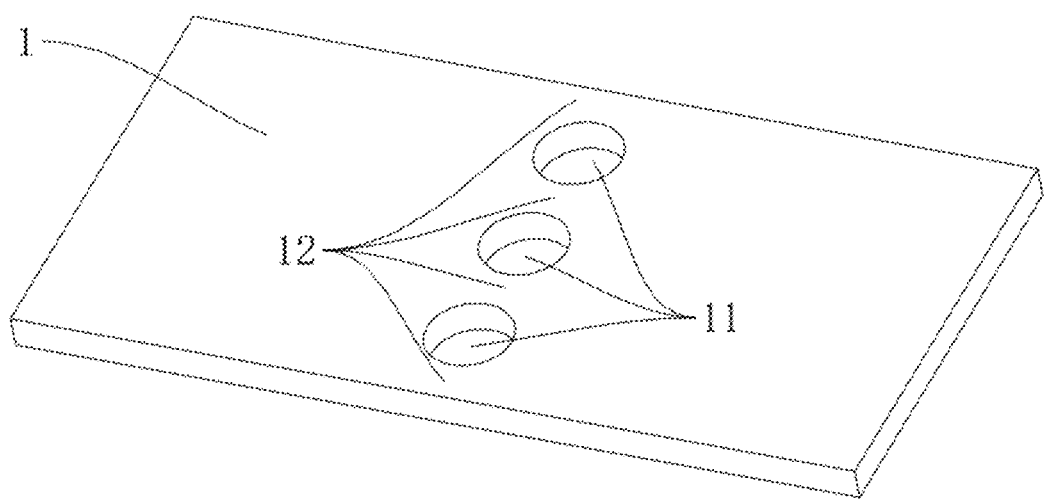
FIG. 6 is a schematic diagram of a third structure of a conductive sheet according to a specific implementation of the present application.
Figure 7:
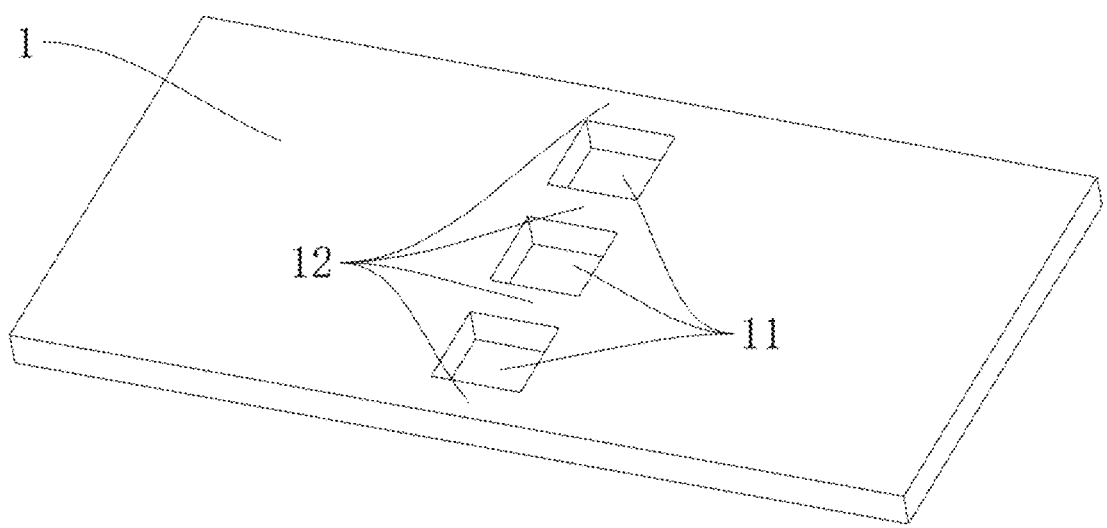
FIG. 7 is a schematic diagram of a fourth structure of a conductive sheet according to a specific implementation of the present application.

In an embodiment, as shown in FIG. 5 to FIG. 7, a plurality of clearance portions 11 and a plurality of connection portions 21 are provided and are in a one-to-one correspondence, and the plurality of connection portions 21 are connected through the load bearing portion 22. The shape, quantity, and positions of the clearance portions 11 are not specifically limited in the present embodiment.

The present embodiment further provides a power battery. The power battery includes a housing, a cover plate, a cell pack, and the foregoing fusing device, wherein the housing is provided with a mounting cavity, the cell pack is mounted in the mounting cavity, the cover plate is configured to block an opening of the mounting cavity, the cell pack is provided with a tab, the cover plate is provided with a terminal, and the tab and the terminal are connected through a conductive sheet 1 of the fusing device, to improve safety performance and reliability of the power battery.

The invention claimed is:

1. A fusing device, comprising:
  a conductive sheet, wherein a clearance portion is arranged on the conductive sheet, and the conductive sheet defines a fusing portion at a clearance remaining position on at least one side of the clearance portion; and
  an insulating connection component, wherein the insulating connection component is provided with a connection portion and a load bearing portion, the insulating connection component is connected to the conductive sheet through the connection portion, the load bearing portion is located below the fusing portion, and molten beads formed after the fusing portion is blown are enabled to fall into the load bearing portion,
  wherein the connection portion comprises a first flange portion, an isolation portion, and a second flange portion, a cross-sectional size of each of the first flange portion and the second flange portion is greater than a cross-sectional size of the isolation portion, the isolation portion is threaded through the clearance portion, and the first flange portion and the second flange portion clamp two end faces of the clearance portion.

2. The fusing device of claim 1, wherein one side of the load bearing portion facing the fusing portion is provided with a groove.

3. The fusing device of claim 2, wherein a groove bottom of the groove is circumferentially provided with a fillet.

4. The fusing device of claim 1, wherein the connection portion is inserted into the clearance portion, a first conductive sub-sheet and a second conductive sub-sheet are formed after the fusing portion is blown, and the connection portion is enabled to separate the first conductive sub-sheet and the second conductive sub-sheet.

5. The fusing device of claim 4, wherein a plurality of clearance portions and a plurality of connection portions are provided and are in a one-to-one correspondence, and two adjacent connection portions are connected through the load bearing portion.

6. The fusing device of claim 1, wherein a side wall of the first flange portion is arc-shaped.

7. The fusing device of claim 1, wherein a through-hole is arranged in the middle of the connection portion, wherein the through-hole is used to provide space for the deformation of the first flange portion.

8. The fusing device of claim 1, wherein the connection portion is bonded to the clearance portion.

9. The fusing device of claim 1, wherein the fusing portion is arranged on one side or two sides of the clearance portion in a width direction of the conductive sheet.

10. The fusing device of claim 1, wherein the clearance portion is circular, kidney-shaped, or square, and a shape of the connection portion matches the shape of the clearance portion.

11. The fusing device of claim 2, wherein the clearance portion is circular, kidney-shaped, or square, and a shape of the connection portion matches the shape of the clearance portion.

12. The fusing device of claim 1, wherein the clearance portion is a clearance hole.

13. The fusing device of claim 2, wherein the clearance portion is a clearance hole.

14. The fusing device of claim 1, wherein the clearance portion is a clearance groove arranged on a side wall of the conductive sheet.

15. The fusing device of claim 2, wherein the clearance portion is a clearance groove arranged on a side wall of the conductive sheet.

16. The fusing device of claim 1, wherein a material of the insulating connection component is rubber.

* * * * *